United States Patent Office 3,392,319
Patented July 9, 1968

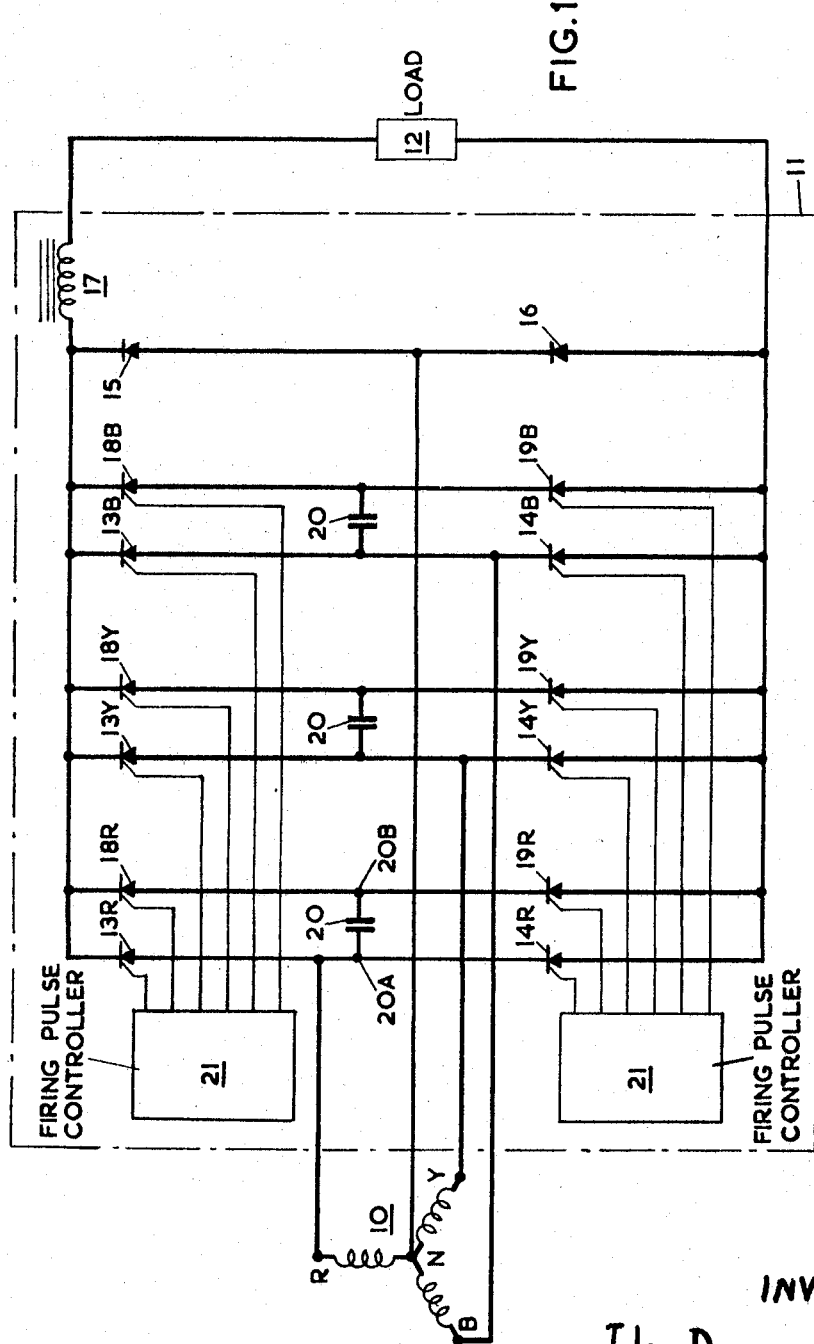

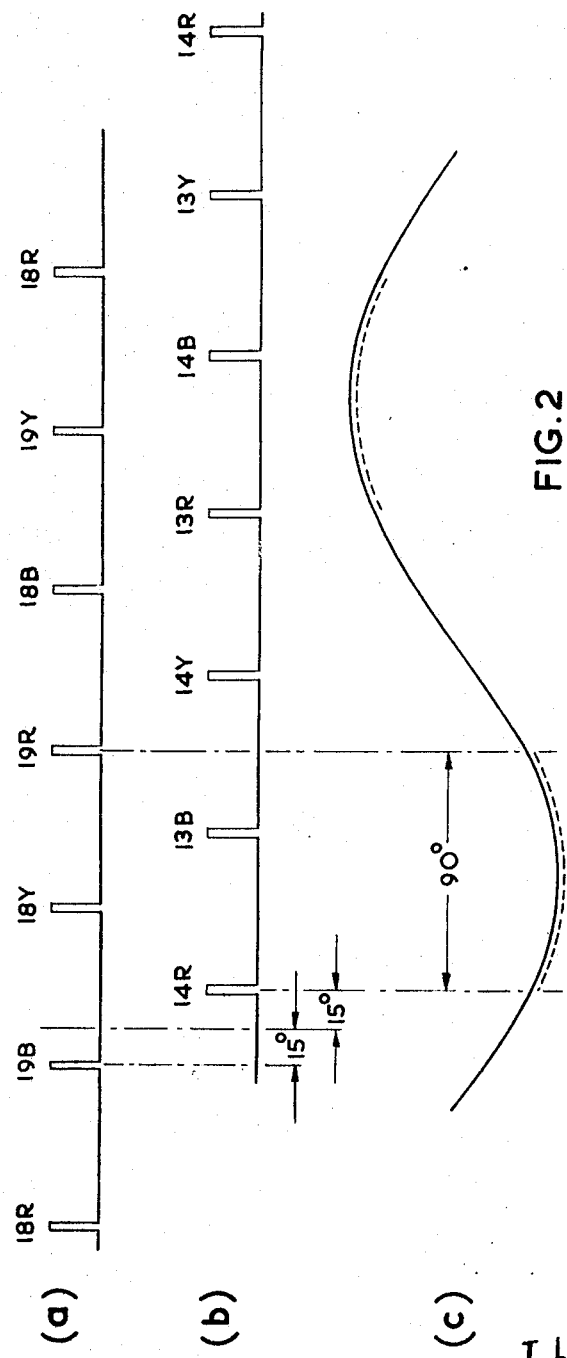

3,392,319
CONVERTOR ARRANGEMENTS
John Duncan McColl and Norman L. Potter, Stafford, England, assignors to The English Electric Company Limited, London, England, a British company
Filed Nov. 19, 1965, Ser. No. 508,727
Claims priority, application Great Britain, Dec. 22, 1964, 52,061/64
7 Claims. (Cl. 321—5)

The inventon relates to static convertors for conveying electrical power between an alternating current source and a direct current load.

According to a feature of the present invention there is provided a static convertor comprising a controllable rectifier and control means for adjustably controlling the phase angles at which the rectifier is both ignited and extinguished during each cycle of the alternating supply voltage applied thereto whereby to control both the average-value voltage, and the power factor, of the electrical power conveyed through said convertor.

The convertor may be single phase of polyphase.

In a convertor according to this invention, the average-value voltage is dependent on the difference between the phase angles at which the rectifier is ignited and extinguished, and the power factor is dependent on the relationship of these phase angles to the angles at which the supply voltage reaches its peak value during each cycle.

A three phase full-wave convertor according to the invention will now be described by way of example and with reference to the accompanying drawings, in which:

FIGURE 1 shows the electrical circuit connections of the convertor; and

FIGURES 2(a) to 2(c) show an operational timing diagram.

Referring now to FIGURE 1, a three phase secondary winding 10 of a power transformer, whose primary winding (not shown) is connected to an A.C. electrical source, is connected by the convertor arrangement 11 to a D.C. load 12.

The convertor arrangement 11 comprises for each phase (Red, Yellow, Blue) two main thyristors 13 and 14 (having the appropriate suffix R, Y or B) connected in series, the junction of the connection between them being conneted to a pole of one phase of the winding 10. These two main thyristors in each phase are arranged to allow current to flow away from and towards the pole of the winding 10, respectively, when they are in a conducting state. Two diodes 15 and 16 are arranged in series and the junction of the connection between them is connected to the neutral pole of the winding 10. In operation, the diodes 15 and 16 are effectively connected in series with the load 12 for carrying the main current conducted respectively through the main thyristors 14 and 13 during conditions in which only one of these thyristors is conducting at any one instant. A smoothing inductor 17 is connected between the diode 15 and the load 12.

Two series connected auxiliary thyristors 18 and 19 (again having the appropriate suffix R, Y or B) in each phase are connected in parallel with the main thyristors 13 and 14, and a capacitor 20, having terminal 20A and 20B, is connected between the junction of the auxiliary thyristors 18 and 19 and the junction between the main thyristors 13 and 14.

Two firing pulse controllers 21 provide firing pulses to the thyristors 13, 14 and 18, 19, respectively, for effecting ignition and extinction of the main thyristors 13, 14 according to predetermined phase angle values of the voltage developed across the winding 10.

A typical sequence of operation of the convertor arrangement will now be described with reference to the Red phase of the winding 10, this sequence of operation being the same for the Yellow and Blue phases.

Initially, the auxiliary thyristor 18R is triggered by a firing pulse from the controller 21 to allow a charging current to flow from the winding 10 to charge up the capacitor 20 so that the potential at the terminal 20A becomes positive with respect to the potential at the terminal 20B. The main thyristor 14R is then triggered at a predetermined ignition phase angle to allow a main current to flow in the load 12 through the main thyristor 14R, and through diode 15 and/or either or both of the main thyristors 13Y, 13B depending on the phasing of the firing pulses, as explained below. At the instant it is desired to suppress this main current, at a predetermined extinction phase angle, the auxiliary thyristor 19R is triggered by a firing pulse from the controller 21 so that the capacitor 20 discharges through the thyristors 14R and 19R thereby switching the thyristor 14R to a non-conducting state. The capacitor 20 then continues to receive current through the auxiliary thyristor 19R which charges the capacitor 20 so that the potential at the terminal 20B becomes positive with respect to the potential at the terminal 20A; the thyristor 19R becomes non-conducting as soon as the capacitor 20 acquires a predetermined charge.

The main thyristor 13R is then triggered at a predetermined ignition phase angle to allow a main current to flow in the load 12 through the main thyristor 13R, and through diode 16 and/or either or both of the main thyristors 14Y, 14B depending on the phasing of the firing pulses, as before. At the instant it is desired to suppress this main current, the auxiliary thyristor 18R is triggered by a firing pulse from the controller 21 so that the capacitor 20 discharges through the thyristor 13R and 18R thereby switching the main thyristor 13R to a non-conducting state.

The average-value voltage of the power transferred in each phase in each cycle through the convertor arrangement depends on the position and duration of the conducting period in each cycle between the triggering of the main thryristors 13 and 14, which allows the main current to flow, and the subsequent suppression of that main current.

The power factor of the power transferred in each cycle is controlled by the relative relationship between the conducting period and the positions of maximum voltage of the alternating current source in each cycle developed by the secondary winding 10. For example, if the conducting period is arranged to be symmetrically displaced about the position of maximum secondary voltage within each half cycle the power factor of the power supplied to the load in that half cycle will be unity. In order to make the power factor lagging, a majority of the conducting period must be arranged to fall within the second half of the said half cycle. Similarly, in order to make power factor leading, a majority of the conducting period must be in the first half of the said half cycle.

This is more clearly illustrated in FIGURES 2(a) to (c) which are timing diagrams showing the relative phasing of the trigger pulses for the auxiliary (a) and main (b) trigger pulses and the secondary voltage cycle (c) (Red phase only) for producing 75% of the maximum average-value voltage at unity power factor, the conduction period (90°) during each half cycle being shown in dashed lines.

In particular, the trigger pulses for the auxiliary thyristors have been advanced, and the trigger pulses for the main thyristors have been retarded, by 15° from the position at which the maximum average-value voltage would be obtained, although at this position the trigger pulses would be redundant since natural commutation would take place with the 3-phase system described.

If it is required to reduce the average-value voltage still further at unity power factor the trigger pulses for the auxiliary thyristors should be further advanced and the trigger pulses for the main thyristors should be further retarded by equal amounts. For example, if these pulses are advanced and retarded by a further 15° then the conduction period in each half cycle is 60°, yielding an average-value voltage of 50% of the maximum. If the pulses are advanced and retarded yet again by a further 15° (making 45° in all) then the conduction period is 30°, yielding an average-value voltage of 25% of the maximum.

Under these conditions (unity power factor), when the conduction period of the main thyristors is 120° in each half cycle, yielding the maximum average-value voltage, the diodes 15 and 16 do not carry any of the main current, and their conduction period increases from 0° to 60° as that of the main thyristors decreases from 120° to 60°. Thereafter, as the conduction period of the main thyristors decreases from 60° the conduction period of the diodes decreases also, in step with that of the main thyristors.

In order to reduce the voltage at a lagging power factor the trigger pulses for the main thyristors only, or for both the main and auxiliary thyristors, should be retarded, and in order to reduce the voltage at leading power factor these trigger pulses should be advanced.

Thus, it will be appreciated that by controlling the phase angle in each cycle at which each main thyristor starts conducting (ignites) and also the phase angle in that cycle at which each main thyristor ceases to conduct (extinguishes) the magnitude of the power transferred by the convertor arrangement and the power factor may be controlled. It will also be appreciated that for any value of chosen components the maximum power that can be transferred by the convertor arrangement is done so at near unity power factor and as the power factor decreases from unity the maximum power that may be transferred decreases.

What we claim as our invention and desire to secure by Letters Patent is:

1. A static convertor comprising,
   a plurality of controllable rectifiers,
   an alternating voltage supply source connected to said rectifiers,
   control means for adjustably controlling the phase angles at which each rectifier is both ignited and extinguished during each cycle of the alternating voltage applied thereto whereby to control both the average-value voltage and the power factor of the electrical power conveyed through said convertor,
   means interconnecting said rectifiers so as to form a four-arm bridge network having four apices arranged in first and second opposing pairs,
   two unidirectionally conducting devices connected in series across the first opposing pair of apices in the bridge network, terminal means between said first opposing pairs of apices for receiving an electrical load therebetween, and
   means connecting said alternating voltage supply source between said devices and one apex of the second pair of opposing apices.

2. A static convertor comprising,
   a plurality of controllable rectifiers,
   an alternating voltage supply source connected to said rectifiers,
   control means for adjustably controlling the phase angles at which each rectifier is both ignited and extinguished during each cycle of the alternating voltage applied thereto whereby to control both the average-value voltage and the power factor of the electrical power conveyed through said convertor,
   means interconnecting said rectifiers so as to form a number of four-arm bridge networks equal to the number of phases of the supply and each having four apices arranged in first and second opposing pairs,
   two unidirectionally conducting devices connected in series across the first opposing pair of apices common to each bridge network, and
   means connecting each phase of said alternating voltage supply source between said devices and one apex of the second pair of opposing apices in corresponding ones of said bridge networks.

3. A convertor according to claim 2, comprising
   an auxiliary voltage source connected between said second pair of opposing apices in each said bridge network.

4. A convertor according to claim 3, wherein said auxiliary voltage source comprises a capacitor.

5. A static convertor comprising
   a three-phase alternating voltage supply source,
   three bridge networks each network comprising
   first, second, third and fourth interconnected arms having first and second pairs of diagonally opposing corners,
   a thyristor connected in each arm, and
   a capacitor connected diagonally between said first and second, and third and fourth, arms,
   two diodes connected in series with one another and having a junction terminal therebetween,
   means connecting said diodes diagonally between said second and third, and fourth and first, arms common to all three of the said bridge networks,
   terminal means between said common second and third, and said common fourth and first, arms, for receiving an electrical load therebetween,
   means connecting the three phases of said supply between the common junction terminal and said first and second arms in the three bridges, respectively, and
   control means for alternately applying trigger pulses to the thyristors in said first and second arms, and intermediately applying trigger pulses to the thyristors in said fourth and third arms, in each bridge network, in sequence at predetermined phase angles of the alternating supply voltage whereby to control both the average-value voltage, and the power factor, of the electrical power conveyed through said convertor.

6. A static convertor comprising,
   an alternating voltage supply source,
   a plurality of controllable rectifiers,
   means interconnecting said rectifiers so as to form a four-arm bridge network having four apices arranged in first and second opposing pairs,
   two unidirectionally conducting devices connected in series across the first opposing pair of apices in the bridge network,
   an auxiliary voltage source connected between said second pair of opposing apices,
   means connecting said alternating supply source between said devices and one apex of the second pair of opposing apices,
   control means for adjustably controlling the phase angles at which the rectifiers are both ignited and extinguished during each cycle of the alternating voltage applied thereto whereby to control both the average-value voltage and the power factor of the electrical power conveyed through the convertor and an electrical load connected across said first opposing pairs of apices.

7. A static convertor comprising,
   a polyphase alternating voltage supply source,
   a plurality of controllable rectifiers,
   means interconnecting said rectifiers so as to form a number of four-arm bridge networks equal to the number of phases of the supply and each having four apices arranged in first and second opposing pairs,
   two unidirectionally conducting devices connected in series across the first opposing pair of apices common to each bridge network, a separate auxiliary voltage source connected between said second pair of opposing apices in each bridge network, means connecting each phase of said alternating supply source between said devices and one apex of the second pair of opposing apices in corresponding ones of said bridge networks, and control means for adjustably controlling the phase angles at which the rectifiers in each bridge are both ignited and extinguished during each cycle of the alternating voltage applied thereto whereby to control both the average-value voltage and the power factor of the electrical power conveyed through the convertor.

References Cited
UNITED STATES PATENTS

| | | | |
|---|---|---|---|
| 3,181,053 | 4/1965 | Amato | 321—45 |
| 3,207,974 | 9/1965 | McMurray | 321—45 |
| 3,222,587 | 12/1965 | Lichowsky | 321—45 |
| 3,263,153 | 7/1966 | Lawn | 321—45 |
| 3,315,144 | 4/1967 | Poss | 321—45 XR |
| 3,315,145 | 4/1967 | Menard | 321—44 |
| 3,335,360 | 8/1967 | Reinert | 321—18 XR |

JOHN E. COUCH, *Primary Examiner.*

WARREN E. RAY, *Examiner.*

W. M. SHOOP, *Assistant Examiner.*